US008988985B2

(12) United States Patent
Kini et al.

(10) Patent No.: US 8,988,985 B2
(45) Date of Patent: Mar. 24, 2015

(54) INTERNETWORKING AND IP ADDRESS MANAGEMENT IN UNIFIED MPLS AND IP NETWORKS

(75) Inventors: Sriganesh Kini, Fremont, CA (US); Hector Avalos, Massy Cedex (FR)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 3 days.

(21) Appl. No.: 13/531,252

(22) Filed: Jun. 22, 2012

(65) Prior Publication Data
US 2013/0343175 A1 Dec. 26, 2013

(51) Int. Cl.
*H04L 12/26* (2006.01)
*H04L 12/24* (2006.01)

(52) U.S. Cl.
CPC .................. *H04L 41/0668* (2013.01)
USPC .......................... 370/219; 370/220

(58) Field of Classification Search
None
See application file for complete search history.

(56) References Cited

U.S. PATENT DOCUMENTS

| | | | |
|---|---|---|---|
| 6,618,817 | B1 | 9/2003 | Armstrong |
| 7,626,925 | B1 | 12/2009 | Sivabalan et al. |
| 7,953,103 | B2 | 5/2011 | Raza |
| 8,081,633 | B2 * | 12/2011 | Veits .................. 370/393 |
| 8,446,920 | B2 | 5/2013 | Hillier et al. |
| 8,619,598 | B2 | 12/2013 | Martini et al. |
| 8,638,695 | B2 | 1/2014 | Zheng et al. |
| 2007/0091793 | A1 | 4/2007 | Filsfils et al. |
| 2008/0228932 | A1 * | 9/2008 | Monette et al. ............ 709/229 |
| 2009/0092140 | A1 * | 4/2009 | Gibbons et al. ......... 370/395.31 |
| 2009/0147674 | A1 * | 6/2009 | Scudder et al. ............ 370/225 |
| 2009/0201800 | A1 * | 8/2009 | Naseh et al. .................. 370/217 |
| 2010/0262679 | A1 | 10/2010 | Liu |
| 2011/0274111 | A1 * | 11/2011 | Narasappa et al. .......... 370/392 |
| 2013/0016605 | A1 | 1/2013 | Chen |
| 2013/0308444 | A1 | 11/2013 | Sem-Jacobsen et al. |
| 2013/0332597 | A1 | 12/2013 | Kumar |
| 2013/0336108 | A1 | 12/2013 | Vasseur et al. |

OTHER PUBLICATIONS

Rosen, et al. "Multiprotocol Label Switching Architecture" IETF RFC 3031, Jan. 2001, the whole document.
Bocci, et al. "A Framework for MPLS in Transport Networks" IETF RFC 5921, Jul. 2010, the whole document.
Allan, "Requirements and Framework for Unified MPLS Sub-Network Interconnection" IETF, Oct. 2011, the whole document.
Swallow, et al. "MPLS Fault Management Operations, Administration, and Maintenance (OAM)" IETF RFC 6427, Nov. 2011, the whole document.
Frost, et al. RFC 6375 "A Packet Loss and Delay Measurement Profile for MPLS-Based Transport Networks", Sep. 2011, the whole document.
The International Search Report for the PCT Application No. PCT/IB2013/055127 dated Nov. 27, 2014, the whole document.

* cited by examiner

*Primary Examiner* — Jeffrey M Rutkowski
*Assistant Examiner* — Hardikkumar Patel

(57) ABSTRACT

IP addresses are efficiently assigned and advertised across the boundary of two network domains. The two network domains include an access network that implements MPLS-TP and a core network that implements IP, MPLS, or a combination of both. A primary BN at the domain boundary receives an assignment of an IP prefix for a VPN that connects a set of CEs to one or more SNs. The IP prefix represents a pool of IP addresses. The primary BN assigns only one IP address to both itself and a standby BN for the VPN to minimize the use of assigned IP addresses. The primary BN assigns the other IP addresses to the CEs in the VPN. The primary BN then advertises the IP prefix into the core network to enable routing of network data traffic across the network domain boundary.

16 Claims, 4 Drawing Sheets

INTERNETWORKING AND IP ADDRESS MANAGEMENT IN UNIFIED MPLS AND IP NETWORKS

TECHNICAL FIELD

Embodiments of the invention relate to the field of network operations; and more specifically, to internetworking the communications between two network domains that support different network protocols.

BACKGROUND

Multi-Protocol Label Switching (MPLS), as defined in RFCs 3031 and 3032, describes an architectural framework that supports a variety of network services. MPLS Transport Profile (MPLS-TP) is a profile of MPLS that is targeted at the transport domain of an MPLS network. MPLS-TP also defines an architectural framework for delivering network services.

An access network is a part of a telecommunications network that connects subscribers to their immediate service providers. An access network can be contrasted with a core network, which connects service providers to each other. An access network is generally a transport domain and is suitable for deploying MPLS-TP. However, a core network generally deploys MPLS, Internet Protocol (IP), or a combination of MPLS and IP. Due to the different protocols used in these two network domains, an interworking layer is typically implemented at the boundary between the two domains to facilitate the inter-domain communications. This interworking layer can be designed as a third architecture or layer, such as a Virtual Local Area Network (VLAN), as is typical the case in handoffs between two network domains. However, this third architecture or layer can introduce a new set of problems, such as a need for re-designing resiliency and operations, administration and maintenance (OAM), which can cause a significant increase both in capital expenditure and operating expenses of a telecommunications network.

SUMMARY

A primary border node (BN) and a standby BN are provided for internetworking two network domains, such that IP addresses are efficiently assigned and advertised across the network domain boundary. The two network domains include an access network that implements MPLS-TP and a core network that implements IP, MPLS, or a combination of both. The access network includes a plurality of access nodes and is coupled to the core network via the primary BN and the standby BN. One or more service nodes (SNs) are coupled to the core network to provide network services.

In one embodiment, a method is performed by a network node functioning as the primary BN for performing IP address management. The primary BN receives an assignment of an IP prefix for a Virtual Private Network (VPN) from a configuration server coupled to the core network. The VPN connects a set of client edges (CEs) to the one or more SNs via access nodes in the access network and the primary BN. The IP prefix represents a pool of IP addresses. The primary BN assigns only one of the IP addresses to both itself and the standby BN for the VPN to minimize the use of assigned IP addresses for the VPN. The primary BN assigns other ones of the IP addresses to the set of CEs in the VPN. The primary BN then advertise the IP prefix into the core network to enable routing of network data traffic across the network domain boundary for the VPN.

In one embodiment, a network node functioning as a primary BN includes receiver circuitry to receive an assignment of an IP prefix for a VPN from a configuration server coupled to the core network. The VPN connects a set of client edges (CEs) to the one or more SNs via access nodes in the access network and the primary BN. The IP prefix represents a pool of IP addresses. The network node includes transmitter circuitry to send data to the core network and the access network, and a control processor coupled to the receiver circuitry and the transmitter circuitry. The control processor further includes an address management module configured to assign only one of the IP addresses to both the primary BN and the standby BN for the VPN to minimize the use of assigned IP addresses for the VPN, and to assign other ones of the IP addresses to the set of CEs in the VPN. The control processor further includes a routing protocol module configured to advertise the IP prefix into the core network to enable routing of network data traffic across the network domain boundary for the VPN.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DESCRIPTION OF EMBODIMENTS

Figure 1A:
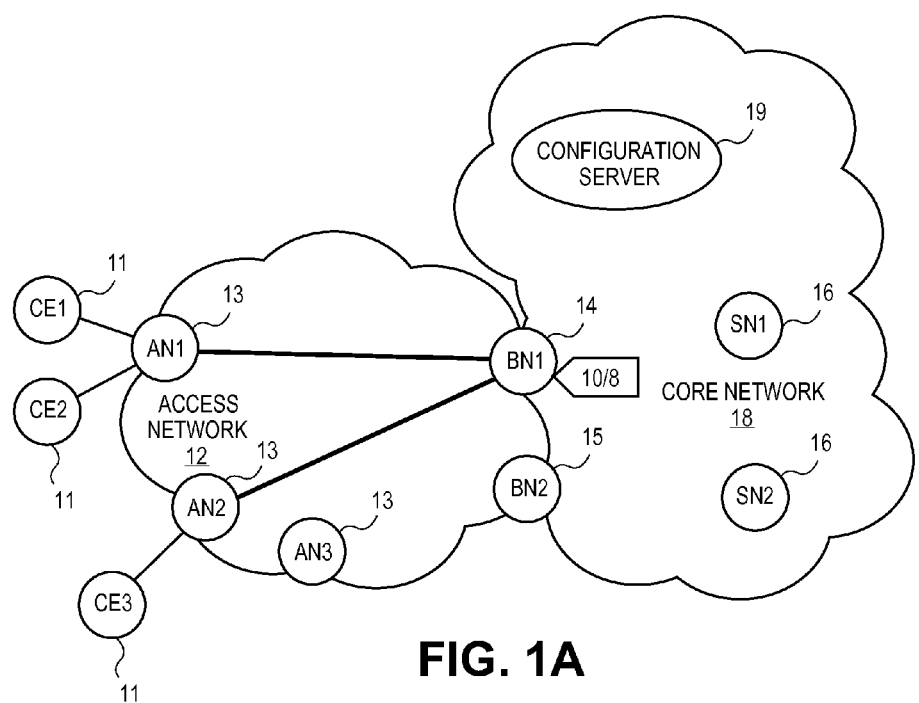
FIGS. 1A and 1B illustrate an embodiment of a network environment in which an access network is coupled to a core network.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide an IP address management mechanism in a unified MPLS architectural framework. The IP address mechanism operates in a network environment in which an access network is coupled to a core network via a pair of redundant border nodes (BNs). One BN serves as the primary BN, and the other BN serves as the standby BN. Each BN is implemented by a network node such as a router for interworking between an MPLS domain (e.g., the core network) and an MPLS-TP domain (e.g., the access network). The interworking function performed by the BN includes terminating, swapping and encapsulating labels. The BNs can be used for IP service termination, which does not require any non-MPLS handoff between the MPLS-TP domain and the MPLS domain. In the embodiments described herein, the core network is not restricted to be an MPLS network; in some embodiments, the core network can be an all-IP network or a combination of MPLS and IP network. Thus, the core network is hereinafter referred to as an MPLS/IP network.

In the network environment described herein, a service node (SN) coupled to a core network may need IP connectivity to a large number (e.g., tens or hundreds of thousands) of customer edges (CEs) that are coupled to an access network. Connectivity between the SN and the CEs is provided by the redundant pair of BNs. The path from SN to the primary BN is an MPLS Label Switched Path (LSP) and the path from the primary BN to the CEs is an MPLS-TP LSP. If either of these LSPs fails or if the primary BN fails, the connectivity between the SN and the CEs can be maintained by switching the affected communication paths over from the primary BN to the standby BN. As described herein, an SN is a networked processing device (e.g., a server computer) that provides services to users. The service provided by an SN can be any generic service such as Voice-over-IP (VoIP), Web services, etc. The SN described herein is coupled to the core network, which includes the scenario where the SN is part of the core network (within the core network), and the scenario where the SN is outside but connected to the core network. A CE is a network node at the customer premises that is connected to an access node of a service provider's network (e.g., an access network). A CE can be a router, cell-site equipment such as a base station, or other network elements. In an embodiment where the CE is a base station, an access node is a device at the cell site that connects the base station to the core network. At a cell site there can be multiple base stations, and therefore multiple CEs. Typically at a cell site there are separate base stations for different network technologies, such as 2G, 3G, Long-Term Evolution (LTE—also referred to as 4G), etc.

In a typical deployment, each service is placed within its own container/sandbox using MPLS based Layer 3 Virtual Private Network (L3VPN). This L3VPN is referred hereinafter as a VPN. Each VPN is a virtualized service network for providing a particular service; e.g., a VoIP service network that provides VoIP service. Different VPNs can be used for delivering services of different types or different technologies; e.g., 2G, 3G, 4G, VoIP, etc. A VPN may include one or more SNs delivering a service to a number of CEs via a BN and a number of access nodes. The MPLS-TP LSP between each of these access nodes and the BN form a pseudowire for the VPN. In the following description, the term "psuedowire" is used synonymously with an MPLS-TP LSP between an access node and the BN. In this typical deployment each VPN typically has its SN identified by a single IP address; therefore the SN has a single IP route (i.e., IP prefix) with the next hop pointing towards the core network. In some other deployments where there is no need for this service network separation, all of the service nodes can be placed into a single IP network or a single MPLS (non-virtualized) network.

The CEs typically need dynamic IP address assignments. These addresses need to be advertised in the routing protocol to the core network. If each of these addresses assigned to an CE is advertised as a separate prefix into the core network (e.g., through the Border Gateway Protocol (BGP) as a VPN route), it would result in a large number of routes to be created in the core network and adversely impact the scaling limits of the core network. Moreover, the entire network becomes less manageable due to the many routes being present in the network. Further, the BN would need to maintain a large number of IP addresses; one for each "IP interface" over the psuedowire, where each connection between the BN and a CE is an IP interface. In an existing network, if there are 10K CEs, 10K IP addresses will be assigned to the CEs and 10K IP addresses will be assigned to the BN, such that the BN has one IP address for each IP interface. Embodiments of the invention reduce the number of assigned IP addresses such that in this example 10K IP addresses are assigned to the CEs, and only one IP address is assigned to the BN for each VPN. As the number of VPNs (e.g., a few tens) is much smaller than the number of CEs, the IP address management described herein can significant reduce the total number of assigned IP addresses in the network. The following description explains embodiments of the IP address management that resolves the above-mentioned problems encountered in the existing networks.

FIG. 1A illustrates an embodiment of an access network 12 coupled to a core network 18 via a pair of BNs (BN1 14 and BN2 15). The access network 12 is a MPLS-TP network and the core network 18 is an MPLS/IP network. The access network 12 includes multiple access nodes 13 (e.g., AN1, AN2 and AN3), each of which is connected to multiple CEs 11 (e.g., AN1 is connected to CE1 and CE2). In one embodiment, BN1 serves as a primary BN and BN2 serves as a standby BN for AN1. Through BN1 and AN1, CE1 and CE2 are able to receive services from service nodes 16 (e.g., SN1) that are coupled to the core network 16.

In one embodiment, a configuration server 19 coupled to the core network 18 is responsible for assigning IP addresses to the CEs. The configuration server 19 is a physical network node separate from the BNs 14 and 15. An example of the configuration server 19 is a Dynamic Host Configuration Protocol (DHCP) server. Other servers implementing different network configuration protocols may also be used; e.g., in one embodiment, the configuration server 19 can be one of the SNs 16. In one embodiment, the configuration server 19 is a physical network node that services multiple VPNs by having a separate instance of the DHCP allocation for each VPN. For each VPN, the configuration server 19 assigns an IP prefix, which represents a pool of IP addresses.

Before describing the IP address management, it is useful to first explain the syntax of an IP prefix. An IP prefix is a binary pattern which matches the first N binary bits of an IP address. The standard syntax is to write the prefix bits in the dotted-quad format, followed by a slash and then the total number of bits in the prefix. For example, a generic format of an IP prefix is A.B.C.D/N, where each of A, B, C and D represent 8 bits in the dotted-quad IP address format, and N is the total number of bits in the prefix. Those bits trailing the first N bits are zeros and they can match any binary patterns. This generic format can be simplified by omitting the trailing zeros. For example, 10.0.0.0/8 can be simplified as 10/8, which means "matching the first 8 bits of 10.0.0.0." Thus, an IP prefix A.B.C.D/N represents a pool of IP addresses that share the same first N binary bits.

In one embodiment, when a CE in a VPN sends an IP address request to a primary BN (e.g., BN1), BN1 determines whether the VPN has already been allocated with an IP prefix earlier. If that VPN has not been allocated with an IP prefix, BN1 can route or tunnel this request to the configuration server 19, which replies to BN1 with an IP prefix allocated to the VNP. If that VPN has already been allocated with an IP prefix, BN1 can look up this IP prefix locally and can allocate one IP address from the prefix to the CE.

As mentioned above, if each address allocated to a CE becomes a separate route that is advertised in the core network, then a large number of prefixes would appear as routes in the core network, which would negatively affect the scalability limits of the core network. On the other hand, advertising the IP address pool for a VPN as one prefix (or a few prefixes) may potentially introduce a new problem for direct IP connectivity between two CEs—as the CEs are not on a broadcast subnet and there is no direct communication path between the CEs. To solve this problem, in one embodiment the BN (e.g., BN1) assigns a single IP address from an IP prefix to itself for a given VPN. This same IP address is used by the BN for each "IP interface" over the pseudowire to the CE that has been allocated an IP address from that IP prefix. Moreover, this IP address is shared across the redundant BNs and acts as the default gateway address for the CEs. More specifically, in the example of FIG. 1A, BN1 and BN2 can have the same IP address for the same VPN.

In one embodiment, BN1 runs an Address Resolution Protocol (ARP) proxy using a single Media Access Control (MAC) address assigned to the BN, thus enabling IP communication between two CEs on the same subnet. A subnet belongs to a VPN; a VPN can be divided into more than one subnet. In the example of FIG. 1A, assume that CE1, CE2, CE3 are on the same subnet. When CE1 sends an IP packet to CE3 which is connected to BN1 through a different pseudowire (than the pseudowire connecting CE1 to BN1), BN1 performs an IP lookup before forwarding the packet to CE3.

Referring to the example of FIG. 1A, CE1 is connected to AN1 which in turn is connected to BN1; CE3 is connected to AN2 which in turn is also connected to BN1. For CE1 to communicate with CE3, CE1 first sends an ARP request by Ethernet broadcasting for the IP address of CE3. This ARP request goes through AN1 to BN1. AN1 forwards the request (at layer 2) without any MAC or IP lookups. BN1 runs an ARP proxy to handle the ARP requests from CEs. Upon receiving the request, BN1 looks up its database (or lookup tables in memory) and identifies that CE1 and CE3 (more specifically, the IP addresses of CE1 and CE3) are connected on the same VPN but to different access nodes (AN1 and AN2). Thus, BN1 responds to CE1 with a successful ARP reply, the reply containing BN1's own MAC address and CE3's IP addresses. After receiving the ARP reply, CE1 sends an IP packet with the destination IP address of CE3 encapsulated in an Ethernet packet with the destination MAC address of BN1. Upon receiving the Ethernet packet (with BN1's own MAC address), BN1 looks into IP packet for the destination IP address. The packet carries an incoming psuedowire label that identifies the psuedowire on which the packet is transmitted to BN1. This incoming psuedowire label can be used by BN1 to determine the VPN that connects to both CE1 and CE3. BN1 then looks up the destination IP address in its VPN lookup table (i.e., a lookup table for the VPN) to identify the outgoing psuedowire of the packet. Both the incoming psuedowire and the outgoing psuedowire belong to the same VPN. BN1 also determines the MAC address of the destination. BN1 then forwards the IP packet by encapsulating it in an Ethernet packet. This Ethernet packet has BN1's MAC address as the source MAC address and CE3's MAC address as the destination MAC address. BN1 then forwards the packet via AN2 to CE3.

In one embodiment, the MAC address at BN1 is also shared with the redundant BNs. More specifically, in the example of FIG. 1A, BN1 and BN2 can have the same MAC address for all of the VPNs that are established across the two network domains 12 and 18. If CE1 switches network connection from BN1 to BN2 (e.g., due to a failure along the path between AN1 and BN1), the destination MAC address for the Ethernet packet that CE1 sends out remains the same. Thus, the CEs can be shielded from any switchover that occurs among the pseudowire connections to the BNs.

Figure 5:
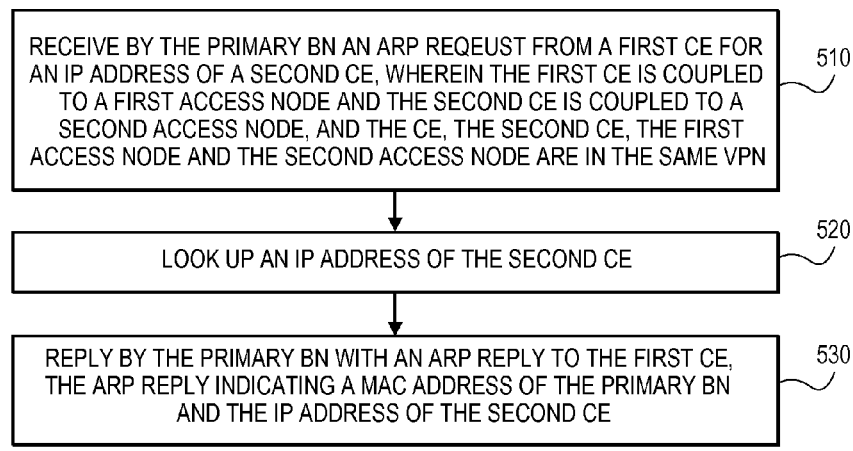
FIG. 5 is a flow diagram illustrating a method of managing IP communications within the same subnet according to one embodiment.

FIG. 5 illustrates an embodiment of a method 500 for a BN to manage an ARP request from a CE as described above. In one embodiment, the method 500 can be performed by a network node (e.g., the network node 300 of FIG. 3A), which functions as a primary BN (e.g., BN1 of FIGS. 1A and 1B) between an access network and a core network.

The method 500 begins with the primary BN receiving an ARP request from a first CE (e.g., CE1) for an IP address of a second CE (e.g., CE3) (block 510). The first CE is coupled to a first access node and the second CE is coupled to a second access node. The first CE, the second CE, the first access node and the second access node are in the same VPN. The primary BN looks up an IP address of the second CE (block 520), and replies with an ARP reply to the first CE, the ARP reply indicating a MAC address of the primary BN and the IP address of the second CE (block 530).

Figure 1B:
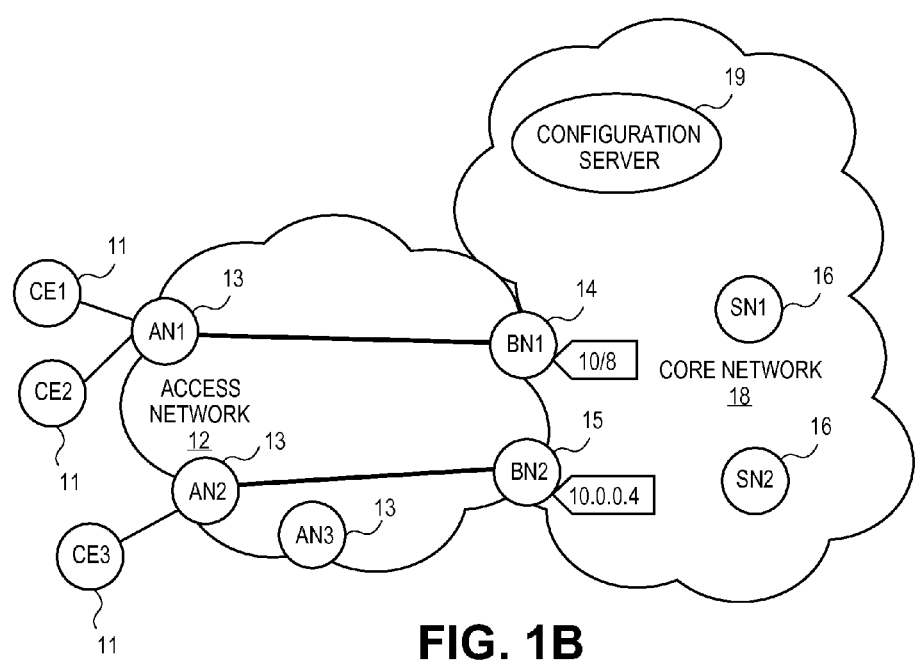

FIG. 1B illustrates an embodiment of the same two network domains as in FIG. 1A, except that in this embodiment AN2 switches it connection from BN1 to BN2 (e.g., due to a failure along the path between AN2 and BN1). Assume that CE1, CE2 and CE3 are in the same VPN, and their IP addresses are assigned from the same IP prefix (e.g., 10/8). For example, the IP address for CE1, CE2 and CE3 may be 10.0.0.2, 10.0.0.3 and 10.0.0.4, respectively. BN1 may assign 10.0.0.1 to itself.

In one embodiment, a primary BN only advertises the aggregate prefixes as VPN routes into the core network 18. Thus, the number of VPN routes is equal to the number of IP prefix pools (which is a fairly small number; e.g., on the order of a few tens). Thus, before AN2's switchover, BN1 advertises only one IP prefix (e.g., 10/8) into the core network 18 for CE1, CE2 and CE3.

After AN2's switchover, BN2 starts advertising the more specific IP addresses as VPN routes into the core network 18 for the CEs that switched over with AN2. As shown in FIG. 1B, after AN2's switchover, BN2 starts advertising the IP address of CE3 (e.g., 10.0.0.4) which is connected to AN2. BN1 continues to advertise the same IP prefix for the VPN as before AN2's switchover. When a network node in the core network 18 receives the advertisements by BN1 and BN2, it uses the more specific IP address (e.g., 10.0.0.4) as the IP address for CE3 and disregards the less specific IP prefix (e.g., 10/8). In one embodiment where multiple CEs switch over to BN2, BN2 also aggregates their IP addresses whenever possible in its advertisement to the core network to reduce the number of advertised VPN routes.

Figure 2:
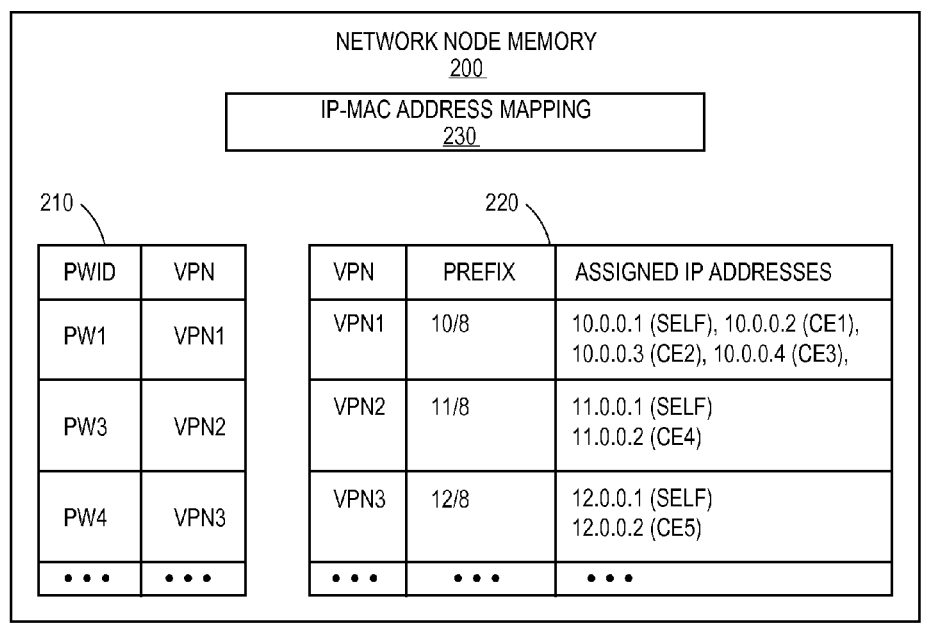
FIG. 2 illustrates data structures maintained at a BN according to one embodiment.

FIG. 2 illustrates an embodiment of data structures maintained in a memory 200 of a BN (e.g., a primary BN, a standby BN or both). In a data structure 210, the BN stores a mapping of pseudowires (identified by their respective PWIDs) to corresponding VPN (i.e. the specific service networks). Using the data structure 210, the BN can identify the VPN to which a request from a particular psuedowire corresponds. In a data structure 220, the BN stores IP address assignment for each VPN, e.g., IP prefix and the individual address assignment for the CEs and itself in that VPN. Using the data structure 220, the BN can determine whether an IP prefix has been assigned to a particular VPN and whether a CE has been assigned an IP address. In a data structure 230, the BN stores a mapping of MAC addresses to IP addresses. The BN can use this mapping to look up the IP address of a destination CE in response to an ARP request from a source CE. In alternatively embodiments, a BN may maintain one or more data structures that include the information of data structures 210, 220, 230, but are organized differently from what is shown in FIG. 2.

Figure 3A:
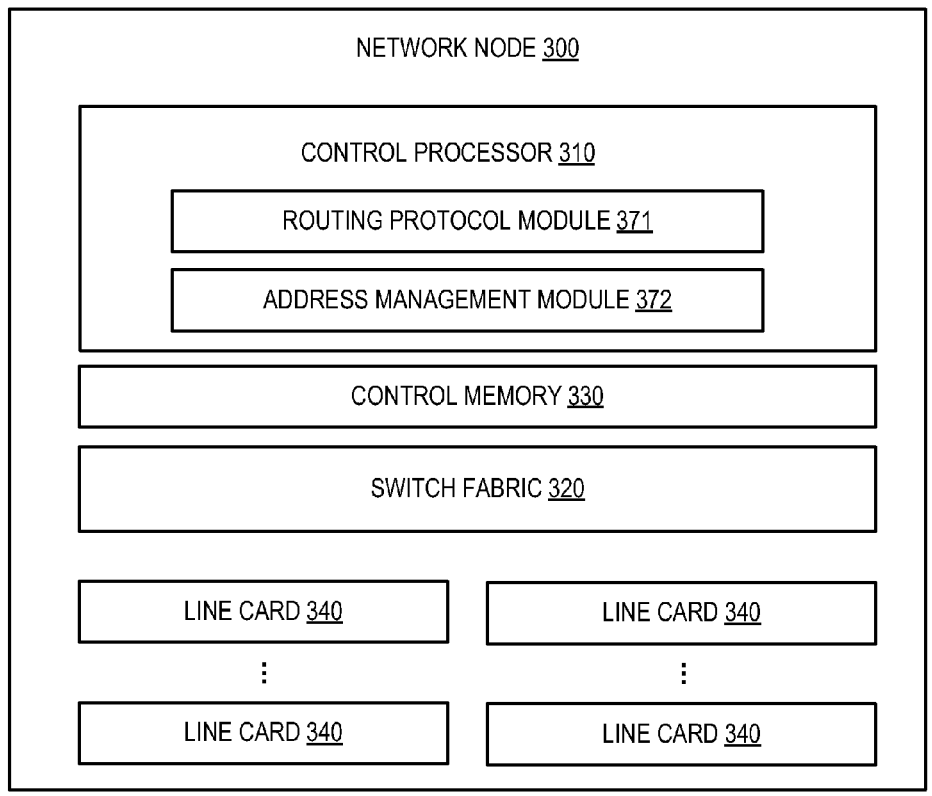
FIG. 3A is a block diagram illustrating a network node according to one embodiment.
Figure 3B:
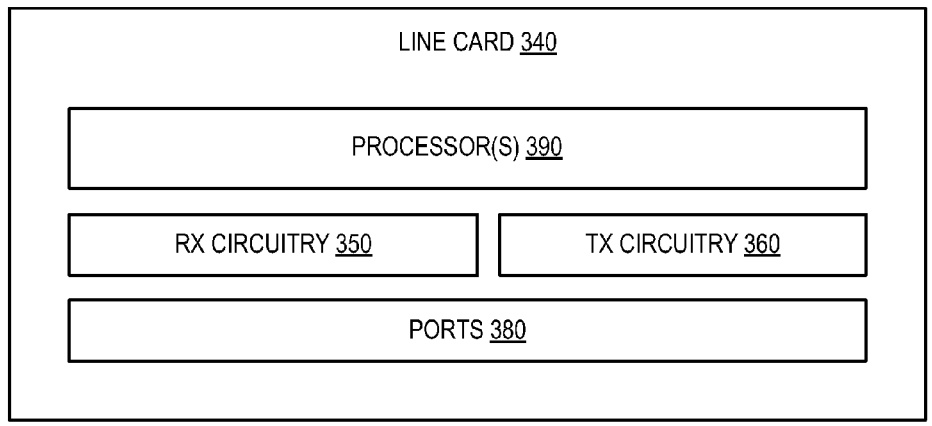
FIG. 3B illustrates an embodiment of a line card in the network node of FIG. 3A.

FIG. 3A illustrates an example of a network node 300 that may function as a primary BN or a standby BN. In one embodiment, the network node 300 is a router that is capable of handling MPLS, MPLS-TP and IP protocols. FIG. 3B illustrates an example of a line card 340 within the network node 300.

As shown in FIGS. 3A and 3B, the network node 300 includes a data plane, which further includes a switching fabric 330 and a number of line cards 340. Each line card 340 include one or more processors 390, receiver (Rx) circuitry 350, transmitter (Tx) circuitry 360 and multiple ports 380. The Rx and Tx circuitry 350 and 360 interface with links in the network through the ports 380 to receive and transmit IP address assignments, respectively. The line cards 340 perform functions on data received over the circuitry 350 and 360, and the switching fabric 330 switches data between the line cards.

The network node 300 also includes a control plane, which is shown as a control processor 310. In one embodiment, the control processor 310 contains control circuitry configured to handle the routing, forwarding, and processing of the data traffic. In one embodiment, the control processor 310 includes a routing protocol module 371 and an address management module 372. The routing protocol module 371 is configured to advertise aggregated IP addresses (e.g., IP prefixes) into the core network. In one embodiment, the advertisement can be made according to any routing protocol, such as Intermediate System to Intermediate System (IS-IS), Open Shortest Path First (OSPF), Border Gateway Protocol (BGP), Routing Information Protocol (RIP), Enhanced Interior Gateway Routing Protocol (E-IGRP), etc. The address management module 372 is configured to assign only one IP address having an IP prefix to both the primary BN and the standby BN for a VPN, and to assign the other IP addresses having the IP prefix to the CEs in that VPN.

The control processor 310 is coupled to a control memory 330. The control memory 330 stores routing information indicating where to forward traffic incoming to the network node 300 and various configuration information. In addition, the control processor 310 also store VPN mapping information and IP address allocation information, such as the example of FIG. 2. It is understood that the network node 300 may include additional components and information than what is described above.

Figure 4:
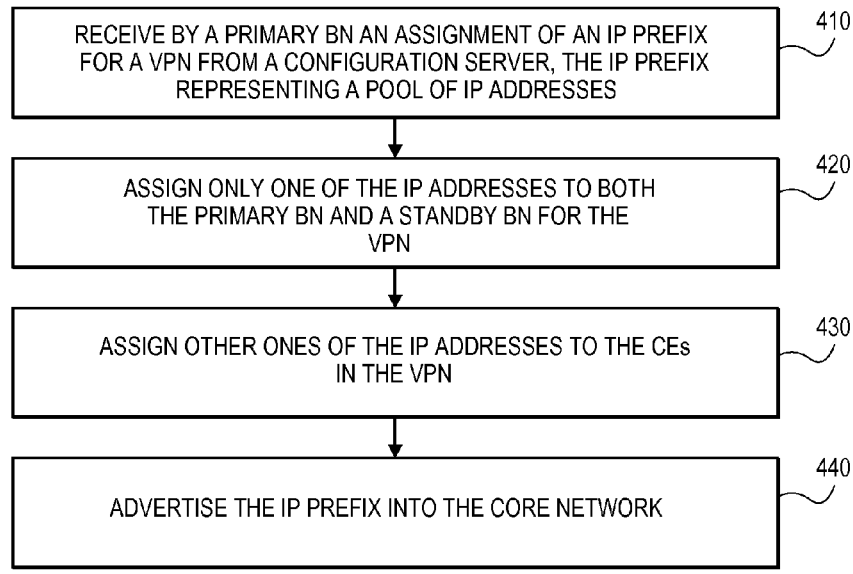
FIG. 4 is a flow diagram illustrating a method of IP address management according to one embodiment.

FIG. 4 illustrates an embodiment of a method 400 of IP address management. In one embodiment, the method 400 can be performed by a network node (e.g., the network node 300 of FIG. 3A), which functions as a primary BN (e.g., BN1 of FIGS. 1A and 1B) between an access network and a core network.

The method 400 begins with the primary BN receiving an assignment of an IP prefix for a VPN from a configuration server coupled to the core network (block 410). The VPN connects a set of CEs to one or more SNs via access nodes in the access network and the primary BN. The IP prefix representing a pool of IP addresses. The primary BN assigns only one IP address having the IP prefix to both itself and the standby BN for the VPN to minimize the use of assigned IP addresses for the VPN (block 420). The primary BN assigns the other IP addresses having the IP prefix to the set of CEs in the VPN (block 430). The primary BN then advertises the IP prefix into the core network to enable routing of network data traffic across the network domain boundary (block 440).

The operations of the diagrams of FIGS. 4 and 5 have been described with reference to the exemplary embodiments of FIG. 3A. However, it should be understood that the operations of the diagrams of FIGS. 4 and 5 can be performed by embodiments of the invention other than those discussed with reference to FIG. 3A, and the embodiments discussed with reference to FIG. 3A can perform operations different than those discussed with reference to the diagrams of FIGS. 4 and 5. While the diagrams of FIGS. 4 and 5 show a particular order of operations performed by certain embodiments of the invention, it should be understood that such order is exemplary (e.g., alternative embodiments may perform the operations in a different order, combine certain operations, overlap certain operations, etc.).

Different embodiments of the invention may be implemented using different combinations of software, firmware, and/or hardware. Thus, the techniques shown in the figures can be implemented using code and data stored and executed on one or more electronic devices (e.g., an end station, a network node). Such electronic devices store and transmit (internally and/or with other electronic devices over a network) code (composed of software instructions) and data using computer-readable media, such as non-transitory tangible computer-readable media (e.g., computer-readable storage media such as magnetic disks; optical disks; read only memory; flash memory devices) and transitory computer-readable transmission media (e.g., electrical, optical, acoustical or other form of propagated signals—such as carrier waves, infrared signals). In addition, such electronic devices typically include a set of one or more processors coupled to one or more other components, such as one or more non-transitory machine-readable media (to store code and/or data), user input/output devices (e.g., a keyboard, a touchscreen, and/or a display), and network connections (to transmit code and/or data using propagating signals). The coupling of the set of processors and other components is typically through one or more busses and bridges (also termed as bus controllers). Thus, a non-transitory computer-readable medium of a given electronic device typically stores instructions for execution on one or more processors of that electronic device. One or more parts of an embodiment of the invention may be implemented using different combinations of software, firmware, and/or hardware.

As used herein, a network node (e.g., a router, switch, bridge, controller) is a piece of networking equipment, including hardware and software, that communicatively interconnects other equipment on the network (e.g., other network nodes, end stations). Some network nodes are "multiple services network nodes" that provide support for multiple networking functions (e.g., routing, bridging, switching, Layer 2 aggregation, session border control, Quality of Service, and/or subscriber management), and/or provide support for multiple application services (e.g., data, voice, and video).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method performed by a primary border node (BN) for internetworking two network domains such that Internet Protocol (IP) addresses are efficiently assigned and advertised across a network domain boundary, the two network domains including an access network that implements MultiProtocol Label Switching Transport Profile (MPLS-TP) and a core network that implements Internet Protocol (IP) or MPLS, wherein the access network is coupled to the core network via the primary BN and a standby BN, and wherein one or more service nodes (SNs) are coupled to the core network, the method comprising:
- receiving by the primary BN an assignment of an IP prefix for a Virtual Private Network (VPN) from a configuration server coupled to the core network, the VPN connecting a set of client edges (CEs) to the one or more SNs via access nodes in the access network and the primary BN, the IP prefix representing a pool of IP addresses;
- assigning only one of the IP addresses to both the primary BN and the standby BN for the VPN to minimize the use of assigned IP addresses for the VPN;
- assigning other ones of the IP addresses to the set of CEs in the VPN;
- advertising the IP prefix into the core network to enable routing of network data traffic across the network domain boundary for the VPN;
- detecting that a given one of the CEs has switched from the primary BN to the standby BN for reaching the core network, the given one of the CEs having an assigned IP address from the IP prefix; and
- continuing advertising the IP prefix by primary BN to the core network after the given one of the CEs has switched to the standby BN, where advertising of the assigned IP address of the given one of the CEs begins at the standby BN after the given one of the CEs has switched to the standby BN.

2. The method of claim 1, further comprising performing a proxy function by the primary BN to enable IP communication between any two of the CEs on a same subnet.

3. The method of claim 1, wherein detecting further comprises:
- receiving by the primary BN an address resolution protocol (ARP) request from a first CE for an IP address of a second CE, wherein the first CE is coupled to a first access node and the second CE is coupled to a second access node, and wherein the first CE, the second CE, the first access node and the second access node are in the VPN;
- looking up an IP address of the second CE; and
- replying by the primary BN with an ARP reply to the first CE, the ARP reply indicating a MAC address of the primary BN and the IP address of the second CE.

4. The method of claim 3, wherein the primary BN and the standby BN share a same MAC address for the VPN.

5. The method of claim 3, wherein the primary BN and the standby BN share a same MAC address for a plurality of VPNs that are established across the two network domains.

6. The method of claim 1, further comprising:
- maintaining a mapping between an identifier of a pseudowire to an identifier of the VPN, wherein the pseudowire connects one of the CEs to the primary BN; and
- identifying the assigned IP prefix for the VPN upon receiving a request from the one of the CEs for address assignment.

7. The method of claim 1, wherein a plurality of VPNs are established across the two network domains, the method further comprising:
- receiving assignments of IP prefixes for the VPNs, wherein different ones of the VPNs are assigned different ones of the IP prefixes; and
- assigning a single IP address out of the IP prefixes to the primary BN and the standby BN for each of the VPNs.

8. A network node functioning as a primary border node (BN), which efficiently assigns and advertises Internet Protocol (IP) addresses across a boundary of two network domains, the two network domains including an access network that implements MPLS-TP (MultiProtocol Label Switching—Transport Profile) and a core network that implements Internet Protocol (IP) or MPLS, wherein the access network is coupled to the core network via the primary BN and a standby BN, and wherein one or more service nodes (SNs) are coupled to the core network, the network node comprises:
- receiver circuitry to receive an assignment of an IP prefix for a VPN from a configuration server coupled to the core network, wherein the VPN connects a set of client edges (CEs) to the one or more SNs via access nodes in the access network and the primary BN, the IP prefix representing a pool of IP addresses;
- transmitter circuitry to send data to the core network and the access network; and
- a control processor coupled to the receiver circuitry and the transmitter circuitry, the processor comprising:
  - an address management module configured to assign only one of the IP addresses to both the primary BN and the standby BN for the VPN to minimize the use of assigned IP addresses for the VPN, and to assign other ones of the IP addresses to the set of CEs in the VPN; and
  - a routing protocol module configured to advertise the IP prefix into the core network to enable routing of network data traffic across the network domain boundary for the VPN, wherein upon detection that a given one of the CEs, which has an assigned IP address from the IP prefix, has switched from the primary BN to the standby BN for reaching the core network, the primary BN is configured to continue advertisement of the IP prefix to the core network, where advertisement of the assigned IP address of the given one of the CEs begins at the standby BN.

9. The network node of claim 8, wherein the processor is configured to perform a proxy function to enable IP communication between any two of the CEs on a same subnet.

10. The network node of claim 8, wherein the processor is further configured to:
- receive an address resolution protocol (ARP) request from a first CE for an IP address of a second CE, wherein the first CE is coupled to a first access node and the second CE is coupled to a second access node, and wherein the CE, the second CE, the first access node and the second access node are in the VPN;
- look up an IP address of the second CE; and
- reply with an ARP reply to the first CE, the ARP reply indicating a MAC address of the primary BN and the IP address of the second CE.

11. The network node of claim 10, wherein the primary BN and the standby BN share a same MAC address for the VPN.

12. The network node of claim 10, wherein the primary BN and the standby BN share a same MAC address for all of a set of VPNs that are established across the two network domains.

13. The network node of claim 11, further comprises memory configured to
- maintain a first mapping between an identifier of a pseudowire to an identifier of the VPN, wherein the pseudowire connects one of the CEs to the primary BN, and a second mapping to map the identifier of the VPN to an assigned IP prefix for the VPN.

14. The network node of claim 8, wherein the processor is configured to receive assignments of a plurality of IP prefixes for the a plurality of VPNs established across the two network domains, wherein different ones of the VPNs are assigned different ones of the IP prefixes, and the processor is further configured to assign a single IP address out of the IP prefixes to the primary BN and the standby BN for each VPN.

15. The network node of claim 8, wherein each of the primary BN and the standby BN is a router.

16. A method performed by a router for internetworking two network domains such that Internet Protocol (IP) addresses are efficiently assigned and advertised across a network domain boundary, the two network domains including an access network that implements MultiProtocol Label Switching Transport Profile (MPLS-TP) and a core network that implements Internet Protocol (IP) or MPLS, wherein the access network is coupled to the core network via the primary router and a standby router, and wherein one or more server computers are coupled to the core network, the method comprising:

receiving by the primary router an assignment of an IP prefix for a Virtual Private Network (VPN) from a configuration server coupled to the core network, the VPN connecting a set of base stations to the one or more server computers via access in the access network and the primary router, the IP prefix representing a pool of IP addresses;

assigning only one of the IP addresses to both the primary router and the standby router for the VPN to minimize the use of assigned IP addresses for the VPN;

assigning other ones of the IP addresses to the set of base stations in the VPN; and advertising the IP prefix into the core network to enable routing of network data traffic across the network domain boundary for the VPN;

detecting that a given one of the base stations has switched from the primary router to the standby router for reaching the core network, the given one of the base stations having an assigned IP address from the IP prefix; and continuing advertising the IP prefix by primary router to the core network after the given one of the base stations has switched to the standby router, where advertising of the assigned IP address of the given one of the base stations begins at the standby route after the given one of the base stations has switched to the standby BN.

\* \* \* \* \*